United States Patent [19]

Maiorano

[11] 4,118,119

[45] Oct. 3, 1978

[54] FACETTED EDGE FADEOUT REFLECTOR

[75] Inventor: Dominick J. Maiorano, Webster, N.Y.

[73] Assignee: Xerox Corporation, Stamford, Conn.

[21] Appl. No.: 719,794

[22] Filed: Sep. 2, 1976

[51] Int. Cl.[2] ........................ G03G 15/00; G03B 27/54

[52] U.S. Cl. ........................................ 355/11; 355/3 R; 355/67; 355/75

[58] Field of Search ........................ 355/3 R, 8, 11, 51, 355/67, 75

[56] References Cited

U.S. PATENT DOCUMENTS

| | | | |
|---|---|---|---|
| 3,788,737 | 1/1974 | Kidd | 355/3 R |
| 3,957,370 | 5/1976 | Vola | 355/11 |
| 3,992,093 | 11/1976 | Jakobson | 355/51 |
| 3,998,541 | 12/1976 | Michaloski | 355/11 |

*Primary Examiner*—Fred L. Braun

[57] ABSTRACT

A photocopying machine wherein a reflected light pattern is projected along an optical path and onto a photoreceptor surface by scanning a document with an illumination source and reflecting mirror arrangement. Thus, a latent electrostatic image remains on the photoreceptor in a predetermined area thereof. The present invention is characterized by the provision of a multi-facetted reflector built into a platen cover such that it overlies the document from which the light image is reflected when the platen cover is closed. Light rays impinge upon those facets of the reflector which extend beyond the edges of the document and are reflected along the optical path to thereby discharge the photoreceptor adjacent said predetermined area to thereby prevent subsequent development thereof.

7 Claims, 5 Drawing Figures

FACETTED EDGE FADEOUT REFLECTOR

BACKGROUND OF THE INVENTION

This invention relates to electrophotographic reproducing apparatus and more particularly, to a document exposure system which provides edge fadeout.

The most common type of electrophotographic reproducing apparatus comprises a transparent platen which supports a document to be reproduced. A scanning optics system including a reciprocating illumination source and first mirror projects a light pattern onto a photosensitive surface having a uniform electrostatic charge thereon thereby discharging the photosensitive surface in accordance with the light pattern resulting in a latent electrostatic image remaining on the surface which is subsequently rendered visible by development with electroscopic marking particles, commonly known in the art as toner.

In most if not all prior art machines a thick document edge together with the relative position of the illumination source produces a shadow along the edge of the document which shadow results in an objectionable dark border or edge on the copy substrate.

Furthermore, if the copy paper size corresponds to the area of the photosensitive member containing the latent image and if the copy paper and image are properly registered than the phenomenon known as border or edge development does not occur. However, it frequently happens that the foregoing is not the case and the border or edge areas are developed with subsequent transfer to result in objectionable copies.

A number of approaches to solve the foregoing problems of edge or border development have been provided for example, the underside of the platen cover of such a machine has been made into or provided with a diffuse reflector as disclosed in U.S. Pat. No. 3,642,371. With such an arrangement portions of the reflector which extend beyond the document act to reflect illumination onto the photosensitive member beyond a predetermined area thereon corresponding to the image area thereby discharging those portions such that they do not get developed.

Another arrangement which provides for edge fadeout, as disclosed in U.S. Pat. No. 3,788,737,comprises an illumination device forming a part of the platen cover thereby providing a source of illumination disposed beyond the borders of the document which illumination serves to discharge the photosensitive member adjacent the areas corresponding to the image area.

It is the primary object of this invention to provide an improved scanning optics system for an electrophotographic reproducing apparatus.

BRIEF SUMMARY AND OBJECTS OF THE INVENTION

Briefly, the objects of the present invention are accomplished by the provision, in an electrophotographic machine, of an exposure system which precludes border or edge development on a copy sheet. Stated differently, the contemplated exposure system comprises means for effecting edge fadeout, such fadeout being defined as the discharging of a photosensitive member adjacent a predetermined area thereon which predetermined area corresponds to the light pattern reflected from the document where the document has a light colored border. Where the document has a dark colored border the predetermined area corresponds to the image area on the photoreceptor.

To this end, the platen cover of the aforementioned electrophotographic machine is constructed so as to include a specular reflector comprising a plurality of angulated facets (i. e. disposed at a predetermined angle relative to the document platen supporting the document to be reproduced). Additionally, the angulated facets are arranged such that they extend rectilinearly and alternative facets are parallel to each other while adjacent facets form an angle therebetween.

In operation with the platen cover closed, some of the facets extend beyond portions of the document and are thereby positioned to have illumination from the scanning exposure system impinge thereon. Such illumination is reflected along the optical path of the machine with subsequent impingement upon the photosensitive member to thereby effect discharge thereof in the border or edge areas.

Facetted reflectors are per se known, for example, U.S. Pat. No. 3,293,982, discloses an unsymmetrical reflective supporting stage comprising conoidal specularly reflective surfaces of increasing diameter and inclination. However, the conoidal arrangement of the specular surfaces or facets precludes employment of such a structure as an edge fadeout device of the type herein contemplated. Moreover, since successive facets have increasing inclination, such a reflector would not be suitable for a scanning optics type exposure system.

With respect to specular reflectors utilized in conjunction with electrophotographic copying apparatus, U.S. Pat. No. 3,914,049 is of interest. This patent discloses specularly reflective surfaces which are designed to reflect light at an angle from the normal to the platen so as to avoid reflecting light directly at a photodetector, employed for maintaining constant irradiance at the image plane or at the photoreceptor.

BRIEF DESCRIPTION OF THE DRAWINGS

Other objects and advantages of the present invention will become apparent on reading the following detailed description and upon reference to the drawings in which.

DETAILED DESCRIPTION OF THE PREFERRED EMBODIMENT OF THE INVENTION

Figure 1:
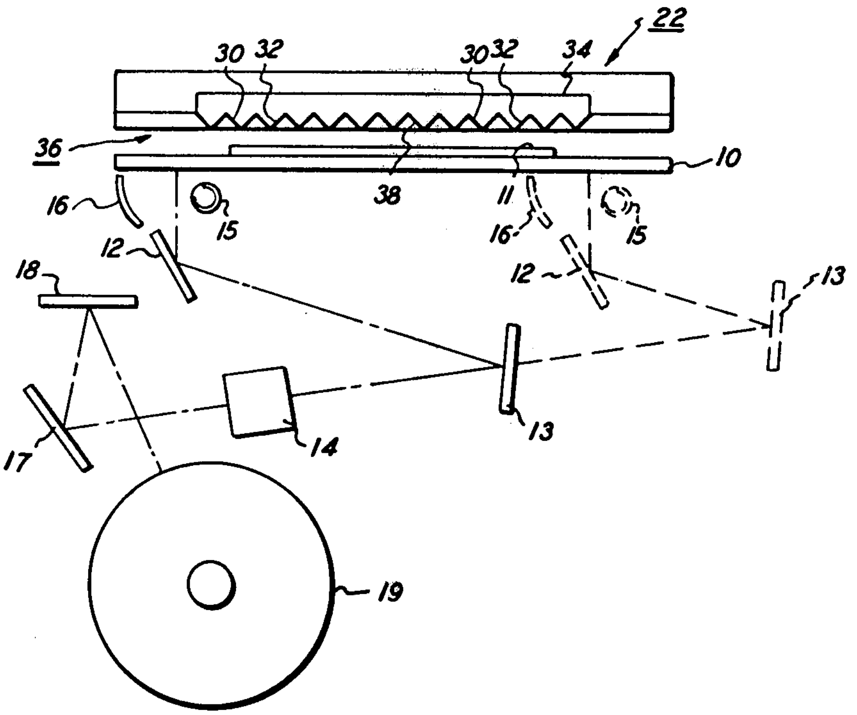
FIG. 1 illustrates a schematic view of an optical scanning exposure system representing the invention.

Referring to the drawings, especially FIG. 1 a transparent platen 10 is provided to support a document 11 to be reproduced. A scanning mirror system including two movable mirrors 12 and 13 shown in their extreme left and right positions in full and dotted line, respectively, is provided. The mirror 13 is arranged to move at a velocity less than the velocity of mirror 12 during scanning to maintain the optical distance constant between the document 11 and the lens 14. A tubular lamp 15 and reflector 16 extending across the platen 10 parallel to the mirror 12 move in synchronism with the mirror 12. The lamp 15 and reflector 16 are provided as illumination means to illuminate the document 11 through the platen 10 during scanning.

An optical path extending from the platen 10 to the lens 14 continues beyond the lens to reflect a light pattern in sequence by mirrors 17 and 18 which light pattern ultimately impinges on a photoreceptor drum 19. An optical slit (not shown) may be provided in a cover plate (not shown). The slit is provided to delimit the image field for the purpose of preserving image quality in accordance with well known concepts.

A platen cover 22 adapted to be hinged to the machine housing (not shown) is provided above the platen 10 and comprises as an integral part thereof a reflector structure generally designated 24.

In operation, the document 11 is scanned by the sweep of mirrors 12 and 13 from left to right (as viewed in FIG. 1) thereby transferring a light pattern reflected from the document onto the photoreceptor 19 which rotates in synchronism with the movement of the mirrors 12 and 13. The light pattern impinges on the photoreceptor 19 in a predetermined area thereof which had previously been uniformly charged by a suitable electrostatic charging structure (not shown), such charging structure being well known in the xerographic arts. In a well known manner, the uniformly charged area is discharged in accordance with the light pattern impinging thereon thereby resulting in a residual latent electrostatic image on the photoreceptor which image is subsequently rendered visible by development with electroscopic marking particles commonly known as toner.

Figure 2:
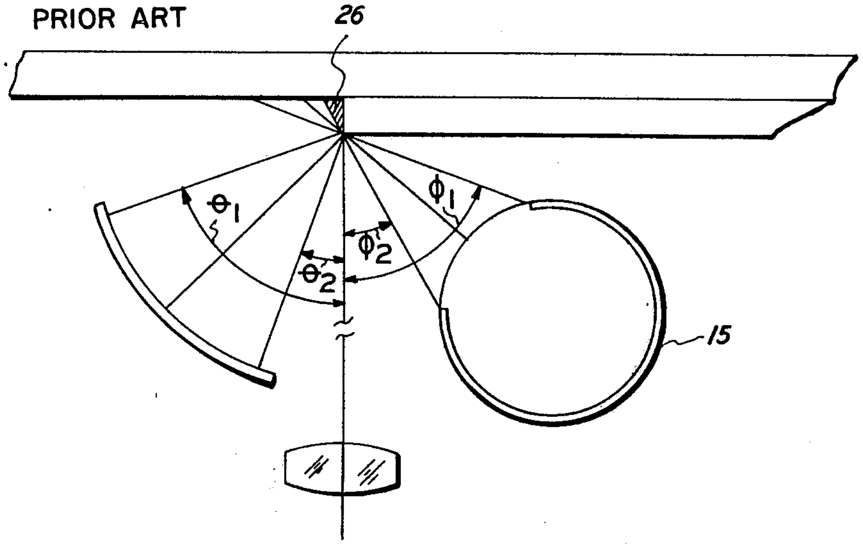
FIG. 2 is a schematic representation of a prior art exposure system.

In a prior art illumination system as shown in FIG. 2, a shadow indicated at 26 is caused by the edge thickness of the document and the relative position of the illumination source (i.e. lamp 15). This shadow constitutes a dark edge coextensive with the document edge which, in the absence of the reflector 24 would be transferred through the optical system thereby resulting in a dark edge being developed on the photoreceptor. In other words, an area or line on the photoreceptor corresponding to this edge is not discharged and therefore becomes developed with subsequent transfer to the copy paper.

Figure 4:
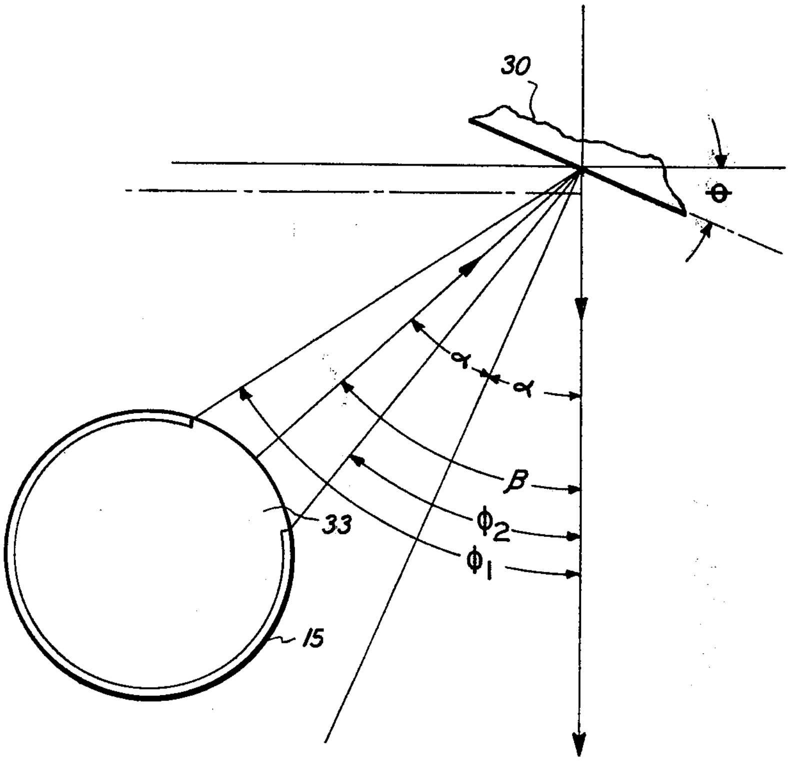
FIG. 4 is a schematic representation of an illumination source and reflecting surface utilized in the formula for determining facet angles of the edge fadeout reflector.
Figure 3:
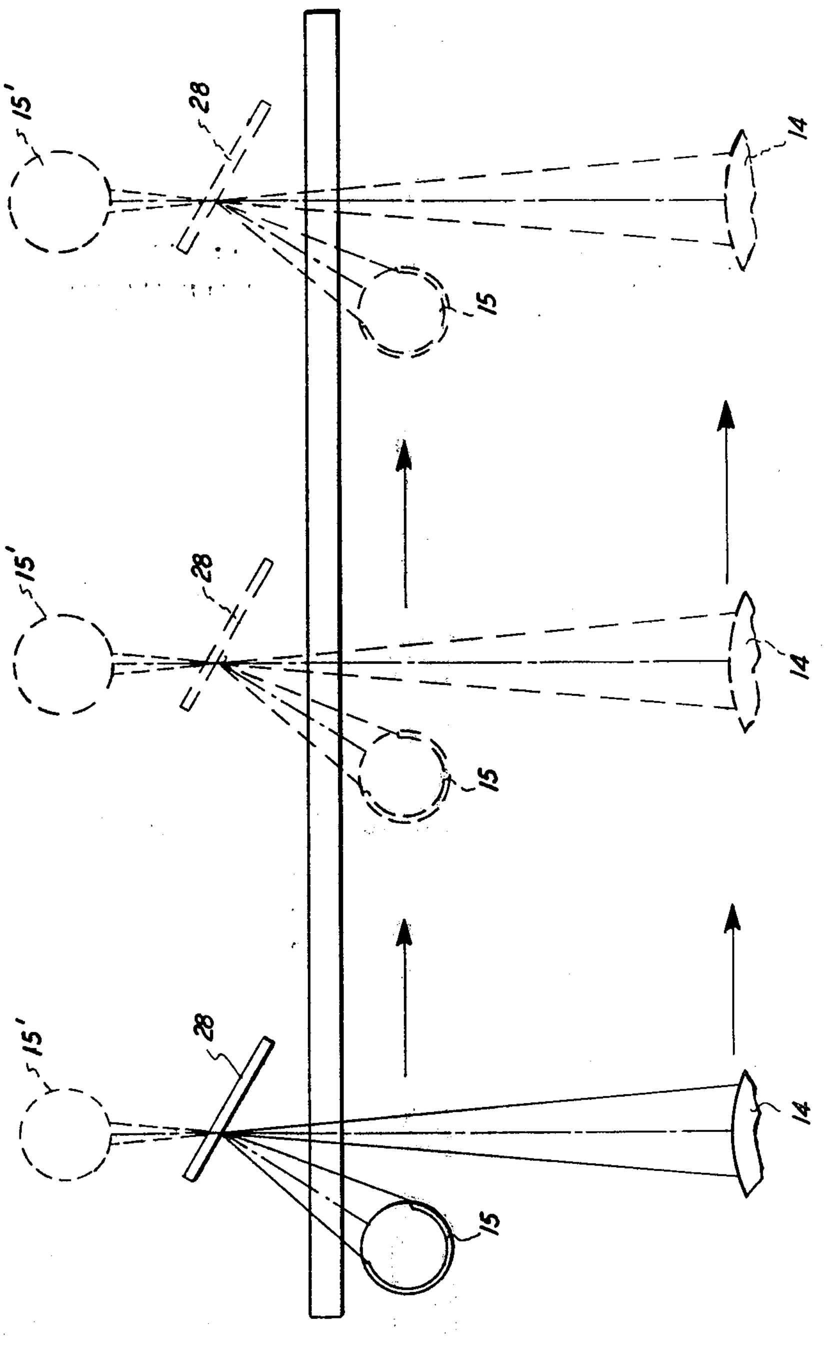
FIG. 3 is a schematic representation illustrating the theory underlying an edge fadeout reflector forming a part of the present invention.

A source of radiation illustrated in dotted line and indicated by reference character 15' (FIG. 3) would provide the radiance required to fade out dark borders or shadows of a document. A mirror 28 could be positioned to redirect radiation from the lamp 15 into the aperture of the lens 14. The mirror 28 would have to be moved relative to the platen 10 in synchronism with the movement of the lamp 15. Obviously, this would not be practical. Therefore, the reflector structure 24 is provided with a series of small mirrors or facets 30 and 32 (see FIGS. 1 and 5) which are positioned over the platen and the document supported thereby such that at any scan point along the platen, part of the lamp aperture will always be viewed by the lens aperture. Since the angle at which the lamp radiation is reflected into the lens aperture remains constant, all mirror or facet angles are the same. As viewed in FIG. 4, the facet angle $\theta$ is determined in accordance with the following formula:

$$\theta = \alpha = \alpha' = \tfrac{1}{2}\beta = \tfrac{1}{4}(\phi_1 + \phi_2)$$

where $\beta$ = Angle between incident and reflected ray $\alpha$ = Angle of incidence $\alpha'$ = Angle of reflectance $\theta$ = Facet Angle $\alpha = \alpha' = \theta = \tfrac{1}{2}\beta$ $\beta = \tfrac{1}{2}(o_1 + o_2)$ $\theta = \tfrac{1}{4}(\phi_1 + \phi_2)$ $\phi_1$ = 1st boundary ray from lamp aperture to intersection of optical axis with the desired principal plane of the edge fadeout reflector $\phi_2$ = 2nd boundary ray from lamp aperture to intersection of optical axis with the desired principal plane of the edge fadeout reflector The facet angle for facet 32 for reflecting opposing reflector radiation when the lamp 15 and reflector 16 are positioned adjacent the right side or edge of the document as viewed in FIG. 1 is determined in the same manner as described in conjunction with determining the angle for facets 30. While the angle $\theta$ for the facets 30 and 32 may be on the order of 0°–45°, the preferred angle is 20°.

The central ray (FIG. 4) is at the center of the lamp aperture 33 as viewed from the point of incidence at the facet 30 or reflector surface. The angle between the central ray and the optical axis is $\beta = \tfrac{1}{2}(\phi_1 + \phi_2)$. Since the principal plane of the edge fadeout reflector 24 is parallel to the object plane and perpendicular to the optical axis, the facet angles are equal to the angle of incidence and reflectance. This holds in cases where it is desired to reflect the central ray along the optical axis resulting in the facet angle $\theta$ being equal to the formula expressed above.

The reflector structure 24 preferably comprises a sheet of material having a substantially planar upper area 34, and as shown in the drawings by way of example, a faceted lower area 36. Preferably the reflector structure is fabricated from a thermoplastic carbonate-linked polymer commercially available under the trademark Lexan Polycarbonate-0107 from the General Electric Company, Pittsfield, Massachusetts. Alternately, methyl methacrylate may be employed, or other material which can be manipulated to obtain a facetted specular reflective surface. The faceted area 28 comprises a first set of parallel facets 30 and a second set of parallel facets 32 which are so arranged that an adjacent pair of facets 30 and 32 form an angle = 180° $(\theta_{lamp} + \theta_{opposing\ reflector})$ therebetween. Also, the facets are arranged such that they are disposed in a rectilinear orientation extending substantially perpendicular to one axis of the platen 10. The spatial frequency of the facet pair 30 and 32 is preferably greater than one half the resolving power of the optical system and there are preferably five facet pairs per millimeter.

The surfaces of the facets 30 and 32 are coated as indicated at 38 to thereby render them 0.90 specular at a wavelength of 590NM. In the preferred method of coating the surfaces, aluminum is vacuum deposited thereon.

The aforementioned reflector structure 24 serves to preclude the development of the photoreceptor in areas that correspond to the shadow area 26. To this end, the reflector structure 24, as shown in FIG. 5, reflects illumination from the lamp 15 and reflector 16 such that the photoreceptor is discharged in those areas in a manner to be described hereinafter.

Figure 5:
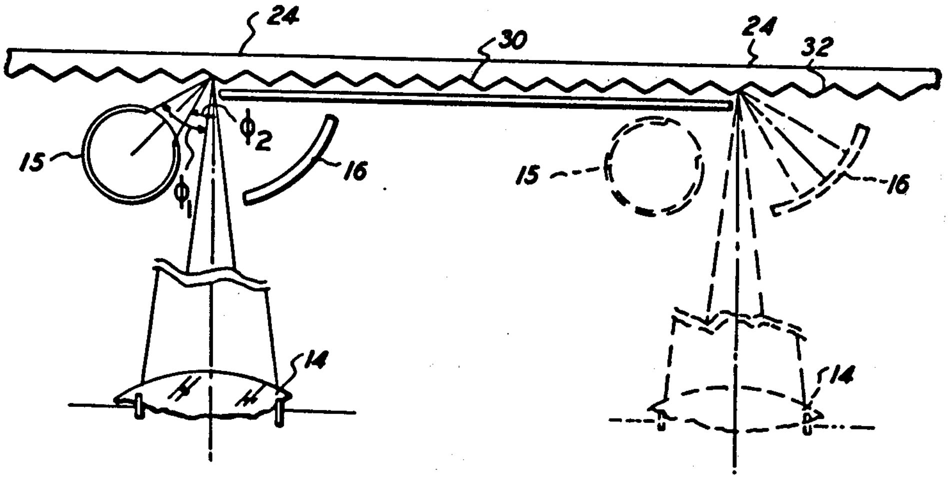
FIG. 5 is a schematic representation of an exposure system incorporating an edge faceout reflector according to the present invention.

As viewed in FIG. 5, when the lamp 15 and reflector 16 are opposite the lead edge (i.e. left side of platen 11 as viewed in FIG. 1) of the document 10, the lamp acts as the source of illumination. The facet 30 adjacent the leading edge of the document cooperates with the source radiance (i.e. the lamp 15) to prevent a dark edge from being transferred through the optical system. Consequently, the copy will not have a dark edge or border. When the lamp 15 and reflector 16 are adjacent the trailing edge (i.e. right side of platen as viewed in FIG. 1) the reflector 16 acts as the source of radiance and cooperates with the facet 32 opposite the trailing edge to prevent a shadow or dark edge from being transferred through the optical system.

The radiometry for the inboard and outboard edges (i.e. top and bottom of document) is the same as for leading and trailing edge. Accordingly, the reflector functions in the same manner to eliminate the border or edge development along the top and bottom of the copy.

While the invention has been described in accordance with the preferred embodiment, it will be appreciated that various modifications which do not depart from the spirit and scope of the invention will become apparent and it is intended that such modifications be covered in the claims appended hereto.

What is claimed is:

1. Exposure apparatus for directing a light pattern, reflected from a document retained in a stationary position by a transparent support, along a predetermined path terminating at the surface of a photoreceptor whereby the light pattern is effective to discharge a uniformly charged portion of the photoreceptor in accordance with the light pattern thereby leaving a latent electrostatic image thereon, said apparatus comprising:

a light source for illuminating said document, through said transparent support, and also illuminating portions of said support extending beyond said document; and specular reflector means disposed adjacent the side of said document opposite said light source for reflecting the illumination from said light source extending beyond said document along said predetermined path whereby said photoreceptor is discharged in areas adjacent the area on said photoreceptor struck by said light pattern, said specular reflector means comprising pairs of planar reflecting surfaces each surface being disposed at a predetermined angle relative to said transparent support and one surface of one pair being parallel to each corresponding surface of the other pairs and the other surface of said one pair being parallel to each corresponding surface of said other pairs.

2. Apparatus according to claim 1 wherein said illumination source comprises a lamp and a reflector the former of which cooperates with at least one planar surface adjacent one edge of said document and the latter of which cooperates with at least one planar surface disposed adjacent the opposite edge of said document, said at least one planar surface cooperating with said one edge and said at least one planar surface cooperating with the opposite edge being non-parallel to each other.

3. Apparatus according to claim 2 including an opaque cover for said transparent support and wherein said specular reflector is contained in said cover.

4. Apparatus according to claim 3 wherein said predetermined angle is on the order of 0°–45°.

5. Apparatus according to claim 4 wherein adjacent planar surfaces comprise a facet pair forming an angle therebetween and said reflector preferably comprises approximately five facet pairs per millimeter.

6. Apparatus according to claim 4 wherein said predetermined angle is approximately 20°.

7. Apparatus according to claim 6 wherein said specular surfaces are at least 0.90 specular at a wavelength of 590NM.

* * * * *